United States Patent [19]
Riley et al.

[11] Patent Number: 5,293,488
[45] Date of Patent: Mar. 8, 1994

[54] MESSAGE-ROUTING APPARATUS

[75] Inventors: Martyn J. Riley, New Pitsligo, Scotland; Anthony J. Wiley, Bristol, United Kingdom

[73] Assignee: Hewlett-Packard Company, Palo Alto, Calif.

[21] Appl. No.: 935,813

[22] Filed: Aug. 26, 1992

[30] Foreign Application Priority Data

Sep. 3, 1991 [EP] European Pat. Off. ......... 91114793.2

[51] Int. Cl.$^5$ ............................................. G06F 13/00
[52] U.S. Cl. ..................................................... 395/200
[58] Field of Search ................. 395/200; 370/16.1, 17, 370/60, 32, 67, 85.1, 92, 93, 94.1, 95.2, 105.1; 364/940.71, 229.3, 927.92, 942.06, 284.4, 242.94, 222.2, 238.1, 238.2, 242.96, 940.5, 940.61

[56] References Cited

U.S. PATENT DOCUMENTS

| | | |
|---|---|---|
| 4,644,461 | 2/1987 | Jennings . |
| 4,984,235 | 1/1991 | Hillis et al. .............................. 370/60 |
| 5,014,262 | 5/1991 | Harshavardhana .................... 370/60 |
| 5,027,350 | 6/1991 | Marshall ........................... 370/85.13 |
| 5,166,931 | 11/1992 | Riddle ................................. 370/94.1 |
| 5,179,558 | 1/1993 | Thacker et al. ..................... 370/94.3 |

OTHER PUBLICATIONS

IBM Systems Journal vol. 26, No. 4, 1987, Armonk, N.Y., US pp. 414–427; P. E. Green: 'A perspective on advanced peer-to-peer networking'.

Journal of Lightwave Technology vol. LT-3, No. 4, Aug. 1985, New York US pp. 820–823; T. Sverre: 'A 250-Mbit/s ring local computer using 1.3-um single-mode optical fibers'.

*Primary Examiner*—Dale M. Shaw
*Assistant Examiner*—Moustafa Meky

[57] ABSTRACT

Message-routing apparatus is known for routing messages between a plurality of communications networks. Typically, the known apparatus comprises a respective network interface card for each communications network and a shared, processor-based, routing manager with which the cards communicate through a backplane bus system. In order to overcome the bandwidth limitations of such known apparatus, the present invention provides a local routing manager on each card and high-speed, point-to-point, links interconnecting the local routing managers in a closed loop. Each local routing manager recognizes whether a message passed to it is for outward transmission over the associated network; if this is not the case, the message is passed to the local routing manager of the next card. Any messages which the local routing managers are unable to route, are diverted to a shared routing manager.

14 Claims, 5 Drawing Sheets

MESSAGE-ROUTING APPARATUS

The present invention relates to message-routing apparatus for routing messages between a plurality of communications arrangements.

In the present specification, the term "communications arrangement" refers to any means by which one entity can communicate with another. Such means may be constituted by a communications network; indeed, the term "communications network" as used herein should be understood broadly to cover, inter alia, both computer and telephone networks of the type in which discrete messages are passed over the network between entities connected to the network. Although such a network may interconnect a large number of network entities, it is also possible that only two entities are interconnected by the network. The term "message" is also used broadly herein, to cover any discrete data item, such as a data packet, having its own associated destination address.

As a consequence of the proliferation of networks in recent years, particularly in computer-related fields, and of the growing demand for increased connectivity between isolated networks, a class of apparatus has evolved, called "routers" the purpose of which is to route messages between different networks. In order to pass a message from a source entity connected to one network to a destination entity on another network, generally via one or more intervening networks, the message (with the address of its ultimate destination) is passed in a series of hops from network to network via routers that interconnect adjacent networks. Each time the message is passed to a router from one network, the ultimate destination of the message will be examined by the router and the message will then be forwarded on the next hop of its journey over the most appropriate network connected to the router. In sending the message on its next hop, the router addresses the message to a network entity on the onward-bound network, this entity being either another router or, if the destination entity lies on the network concerned, the destination entity itself.

Because the physical addressing schemes used on different types of networks will generally be incompatible, protocols for passing messages across different networks utilize high-level addresses (such as IP, or internet, addresses) that are valid across all networks. Routers will generally carry out their routing function using the high-level destination address carried by each message; however, it is, of course, necessary for the router to derive the address of the next hop destination in terms of a low-level physical address before the message can actually be forwarded.

Figure 1:
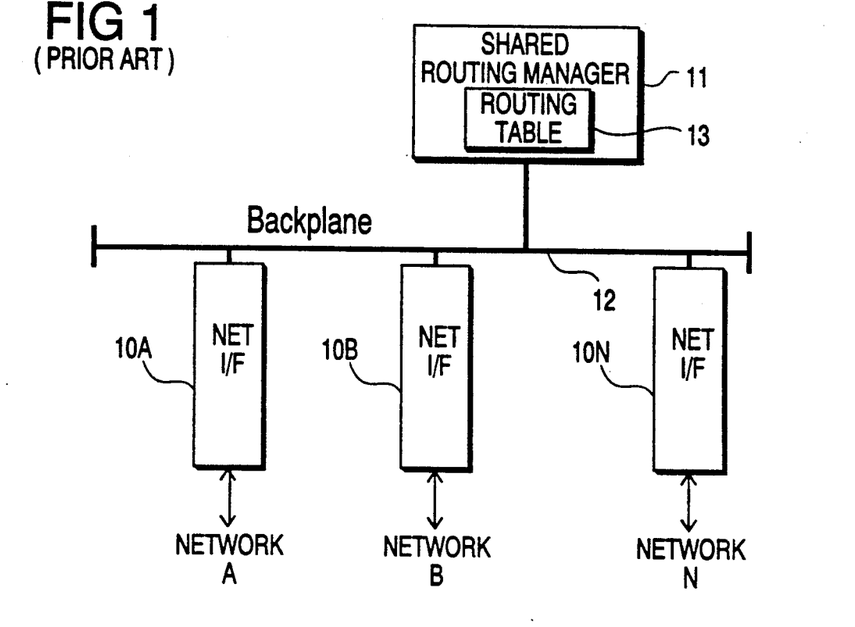
FIG. 1 is a diagram of a known, prior-art, router comprising a plurality of network interface cards employing the services of a shared routing manager.

As illustrated in FIG. 1 of the accompanying drawings, known routers usually comprise a plurality of network interface cards 10A, 10B . . . 10N each operative to receive and/or transmit messages over a respective one of said communications network A,B . . . N; a shared routing manager 11; and a backplane bus system 12 inter-communicating the shared routing manager with the network interface cards. Generally, the interface cards are implemented in the form of dedicated hardware while the shared routing manager is implemented using an appropriately-programmed, general-purpose processor. The shared routing manager 11 provides a shared facility to said network interface cards 10A-10N for routing messages received by the interface cards, on the basis of the high-level destination addresses contained in the messages, to appropriate ones of the cards for onward transmission over the associated network A-N.

The routing information used by the shared routing manager in making its routing decisions, is contained in a routing table 13 that associates high-level destination addresses with the network, and the next-hop address on that network, to which a newly-received message must next be sent. Where strict protocol layering is adhered to, the next-hop address will be in high level form, this address and the associated message being then passed to the relevant network interface card where the high-level next-hop address is resolved into a physical address before the message is finally forwarded on the associated network. More usually, however, the shared routing manager holds the next-hop address in low-level, physical address form so that the interface cards are relieved of the task of translating a high-level next-hop address into a low-level one. It will be appreciated that in both cases the actual routing decisions for all messages are made in the shared routing manager.

The performance of routers of the FIG. 1 form is generally limited by the speed of the processor used to implement the shared routing manager and by the bandwidth of the backplane bus.

One possible approach to performance improvement would be to limit the amount of data transferred across the backplane, for example, by limiting message passing to/from the shared routing manager to the transfer of message headers (the destination address being included in the headers). However, this approach merely alleviates the bandwidth limitations of the backplane-based router architecture rather than providing an effective solution to these limitations.

Another possible approach to improved router throughput would be to provide dedicated hardware to carry out all routing functions rather than using a general purpose processor. This approach suffers from the twin drawbacks of expense and inflexibility.

It is an object of the present invention to provide a message routing apparatus having increased throughput without requiring dedicated hardware for all aspects of its implementation.

SUMMARY OF THE INVENTION

According to the present invention, there is provided message-routing apparatus comprising a plurality of interface units each operative to receive and/or transmit messages over an associated communications arrangement, a shared routing manager, and internal communication means (such as a backplane bus) inter-communicating the shared routing manager with the interface units. The shared routing manager provides a shared facility to the interface units for routing messages received by the units, on the basis of respective destination addresses included in the messages, to appropriate ones of said units for onward transmission over the associated communications arrangement.

Each said unit includes a local routing manager with input means for receiving messages to be routed including messages newly received by the unit from its associated communications arrangement, a first output for messages that are to be transmitted on over the associated communications arrangement, and a second output for other of said messages. The local routing manager provides a limited routing function involving identifying messages received by said input means which, from their destination addresses, are to be transmitted on by the same interface unit over its associated communications arrangement and passing the identified messages, as routed messages, to said first output and other of said messages, as unrouted messages, to said second output.

the apparatus includes a plurality of point-to-point links that serve to interconnect the local routing managers into a closed loop by connecting the second output of each local routing manager to said input means of a next said local routing manager thereby permitting unrouted messages to be passed along between the units for routing. The apparatus further includes forwarding means for passing messages unrouted by the local routing managers to the shared routing manager for routing thereby.

With this architecture, newly received messages will be passed along from one network interface to another between the associated local routing managers until one of the local routing managers recognizes the message as one to be transmitted on over the associated communications network. By implementing the links that interconnect the local routing managers as high-speed links, a high throughput can be achieved, particularly as each local routing manager has sole access to its respective outbound link. The shared routing manager is now only called into action where the local routing managers are unable to route a message, the message being forwarded to the shared routing manager by the forwarding means that serves to recognize such messages. The messages passed to the shared routing manager may conveniently use the internal communications means (generally a backplane bus), these means also being used by the shared routing manager to return the message to the appropriate interface unit for onward transmission. It will be appreciated that any bandwidth limitations inherent in the internal communications means will generally be non-critical to the overall performance of the message-routing apparatus.

It should be noted that while it is preferable that a message is not recognized as unroutable by the local routing managers until it has traversed all such managers, this is not an essential requirement and non-preferred architectures can be envisaged where messages are forwarded to the shared routing manager after having only traversed some of the local routing managers.

The functionality of the forwarding means is preferably provided by the local routing managers jointly with each local routing manager being operative to divert to the shared routing manager any message which, after having previously been passed on as a said unrouted message by that local routing manager, is received back by the input means of the local routing manager. Such an arrangement ensures that all local routing managers have had the opportunity of routing a message before it is passed to the shared routing manager.

To enable a local routing manager to recognize a message as having traversed all local routing managers, each local routing manager is preferably operative to mark each message newly received over the associated communications arrangement that it determines is to be passed as a said unrouted message to its second output, the local routing manager being further operative to monitor messages received by its input means and to divert to said shared routing manager any messages it has previously marked itself. This marking is advantageously in the form of a mark unique to the local routing manager.

Preferably, the local routing manager of at least one interface unit comprises:

a first routing unit to which are passed the messages newly received over the communications arrangement associated with the interface unit, the first routing unit being operative to mark at least certain of these messages and forward them to said second output of the local routing manager, and a second routing unit arranged to receive said unrouted messages that are passed to the said input means of the local routing manager via a said link, the second routing unit being operative to route each message it receives on the basis of the destination address of the message, with messages which the second unit recognizes as intended for onward transmission over the communications arrangement associated with the interface being passed to said first output of the local routing manager and the remaining messages being passed to said first routing unit, the first routing unit being further operative to monitor each message received from the second routing unit and to pass that message to said shared routing manager, via said internal communication means, if the message was previously marked by the local routing manager and otherwise to pass the message to said second output of the local routing manager.

Since a newly received message may, in fact, be addressed to the message-routing apparatus itself, the first routing unit is preferably operative to monitor the destination address of each such message and to pass the message directly to the shared routing manager where the destination address indicates that the message is intended for the message-routing apparatus.

The second routing unit will normally include a local routing table associating particular destination addresses with the network interface unit concerned, the second routing unit being operative to look up the destination address of each said unrouted message it receives in said local routing table and to recognize the message as one intended for onward transmission over the network associated with the network interface unit if the table associates the looked-up address with the interface unit.

The second routing unit is preferably arranged to receive messages routed by the shared routing manager to the interface unit for onward transmission thereby over the associated communications arrangement, the second routing unit being operative to look up the destination address of each such message in its local routing table and if no association exists between that address and the interface unit, to signal to said shared routing manager that no such association exists, the shared routing manager being thereupon operative to update the local routing table via said internal communication means.

DESCRIPTION OF THE PREFERRED EMBODIMENTS

Two routers, each embodying the invention, will now be particularly described, by way of non-limiting example, with reference to the accompanying diagrammatic drawings, in which.

The two routers embodying the invention that are described below are intended to route messages bearing high-level destination addresses in the form of internet, or IP, addresses, the routers operating generally in conformity with the Internet Protocol (see, for example, "Internet working with TCP/IP" Douglas E. Comer, Prentice-Hall, second edition 1991, the disclosure of which is hereby incorporated herein by reference).

First Router

Figure 2:
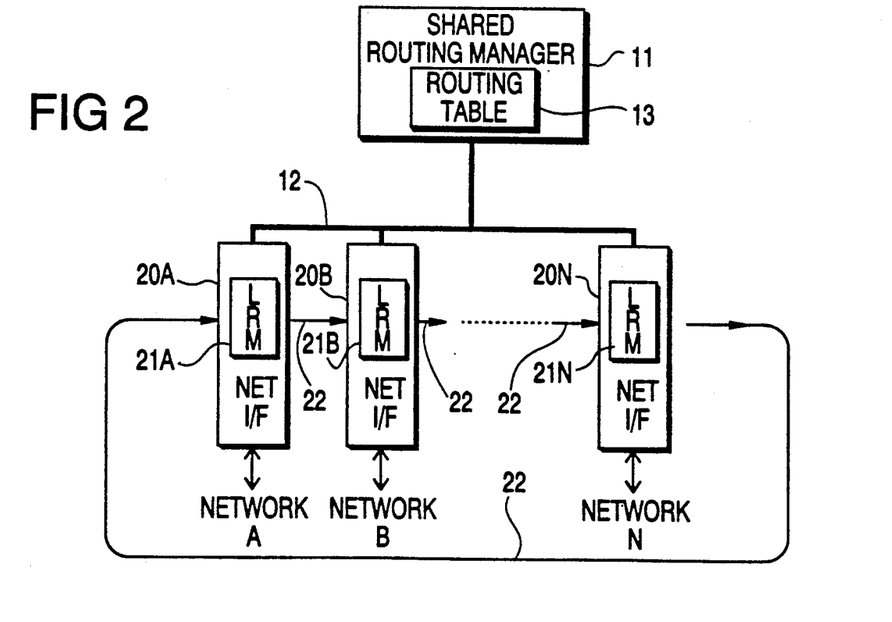
FIG. 2 is a diagram of a first router embodying the present invention, the router including a plurality of network interface units that are inter-connected in a closed loop and, in addition, communicate with a shared routing manager through a common bus.

FIG. 2 is a diagram of a first embodiment of the router embodying invention. This router comprises a plurality of network interface units 20A to 20N operative to transmit and/or receive messages over respective communications networks A to N. In a standard manner, the network interface units 20A to 20N are connected via a common backplane bus 12 to a shared routing manager 11. The shared routing manager 11 is implemented using a general purpose processor running under program control. The shared routing manager 11 maintains a full routing table 13 and has access to databases of routing information. The shared routing manager 11 is operative, when required, to route a message forwarded to it by one interface unit, to an appropriate one of the other interface units for onward transmission, the message being passed between the shared routing manager 11 and the units concerned over the backplane bus 12.

In accordance with the present invention, each network interface unit 20A to 20N is provided with a local routing manager 21A to 21N, and the local routing managers are interconnected into a closed loop by a plurality of unidirectional, point-to-point links 22. In broad terms, the operation of the router involves each message that is newly received from one of the networks A to N, being put into circulation around the closed loop formed by the local routing managers 21 and links 22; each local routing manager 21 that is traversed by this message then examines the message to ascertain whether it is one that should be transmitted on out over the network associated with that local routing manager—if this is the case, then the message is extracted and sent out by the network interface unit concerned over the corresponding network. If after having traversed all of the local routing managers, a message has still not been routed as an outbound message onto one of the networks A to N, then it is passed via the backplane bus 12 to the shared routing manager 11 to be dealt with appropriately.

The links 22 themselves may either be high speed serial links or high speed parallel links. It will be appreciated that it is these links 22 that carry most of the messages in their passage between the receiving and transmitting network interface units 20. The common backplane bus 12 is therefore relieved of having to handle most of the messages although messages unroutable by the local routing managers 21 are still passed over the bus 12 to the shared routing manager 11.

Figure 3:
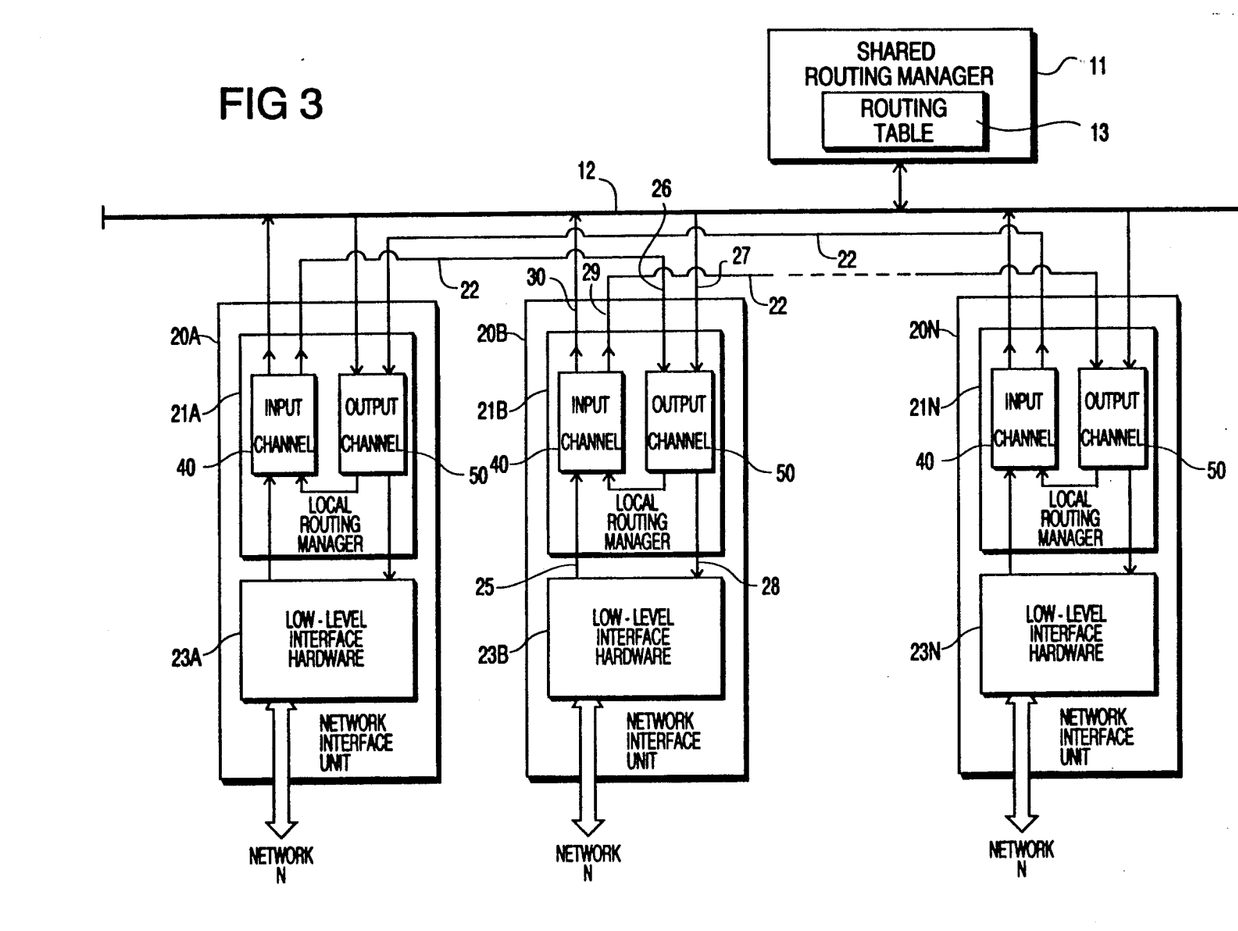
FIG. 3 is a functional block diagram of three network interface units of the FIG. 2 router, showing a low-level interface and local routing manager of each unit.

FIG. 3 shows the arrangement of FIG. 2 in more detail. As can be seen, each network interface unit 20A to 20N comprises low-level interface hardware 23A to 23N and the local routing manager 21A to 21N already mentioned. The purpose of the low level interface hardware 23 is to provide the low level interface functions to the corresponding network (these being the media access control, or MAC, functions and the physical-layer signal conditioning). Where messages are formatted in accordance with the Internet Protocol, then a message received over a network will, after processing by the low level interface hardware 23, emerge as an IP Datagram stripped of any headers and trailers required by the underlying network; conversely, an IP datagram passed to the low-level hardware together with the next-hop physical address, will be encapsulated in a physical-layer frame before being sent out over the network concerned.

Each local routing manager 21 has an input 25 for receiving messages from the low-level interface hardware 23 of the same interface unit; an input 26 to which the inbound link 22 associated with the unit is connected to enable the local routing manager to receive messages passed on from the local routing manager of the immediately-upstream network interface unit (considered in terms of the direction of message circulation around the loop formed by the links 22 and local routing managers 21); and an input 27 from the backplane bus 12 and through which the local routing manager can receive messages from the shared routing manager 11. The local routing manager is further provided with a first output 28 for passing messages to its associated low-level interface hardware 23 for outbound transmission over the corresponding network; an output 29 for forwarding messages over one of the links 22 to the local routing manager of the downstream network interface unit; and an output 30 connecting the local routing manager to the backplane bus 12 to enable unrouted messages to be passed to the shared routing manager 11 for routing. For reasons of clarity, these inputs and outputs have only been referenced in FIG. 3 in respect of the local routing manager 21B.

The local routing manager can also exchange data and control signals with the shared routing manager 11 by standard means, not explicitly shown in the drawings.

Logically, each local routing manager 21 can be thought of as composed of an input channel 40 and an output channel 50. The input channel 40 is connected to the input 25 of the local routing manager and, in addition, is connected to receive messages from the output channel 50 of the same routing manager. The input channel 40 is also connected to the outputs 29 and 30 of the local routing manager 21. The output channel 50 is connected to inputs 26, 27 and to output 28 of the local routing manager; in addition, the output channel is connected to pass messages to the input channel 40 of the same local routing manager.

Figure 4:
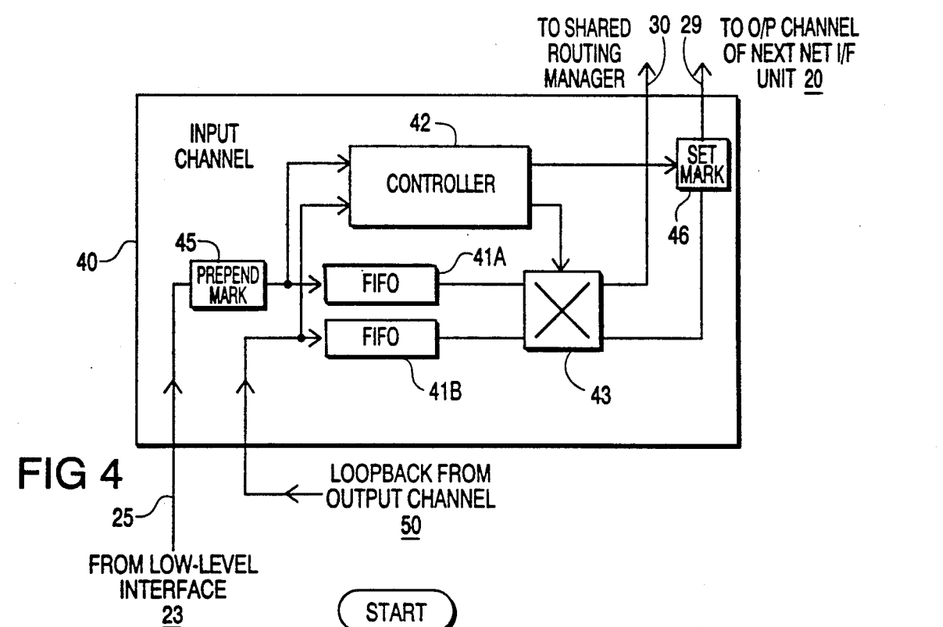
FIG. 4 is a functional block diagram of an input channel present in each local routing manager shown in FIG. 3.

The input channel 40 is shown in functional block diagram form in FIG. 4. The input channel comprises two FIFO (First In First Out) buffers 41A, 41B. The buffer 41B queues messages passed on from the corresponding output channel 50 whilst the buffer 41A queues newly-received messages passed to input 25 of the relevant local routing manager from the corresponding low-level interface hardware 23. In addition, the input channel 40 comprises a controller 42, and a message switch 43 connected on its input side to the output of the FIFO buffers 41A, 41B and on its output side to the outputs 29 and 30 of the local routing manager containing the input channel 40. The controller 42 is operative to monitor the destination addresses of the messages fed to the FIFO buffers 41A and 41B and then to control the switch 43 to switch each message in dependence on its destination address.

For reasons which will become clear below, each message handled by the local routing managers 21 is tagged with a network-interface mark typically in the form of an octet prepended to the message. Each message is provided with this mark as it enters the closed-loop circulation system formed by the local routing managers 21 and links 22, and has its mark removed upon leaving this system. The value of the mark is set by the first local routing manager handling the associated message, to a value that uniquely identifies this local routing manager within the router. To this end, the input channel 40 of each local routing manager includes a prepend-mark unit 45 that prepends an octet, initialized to zero, to each message received from the low-level interface 23, and a set-mark unit 46 controlled by the controller 42 to set the value of the mark prepended to each message output via output 29.

Figure 5:
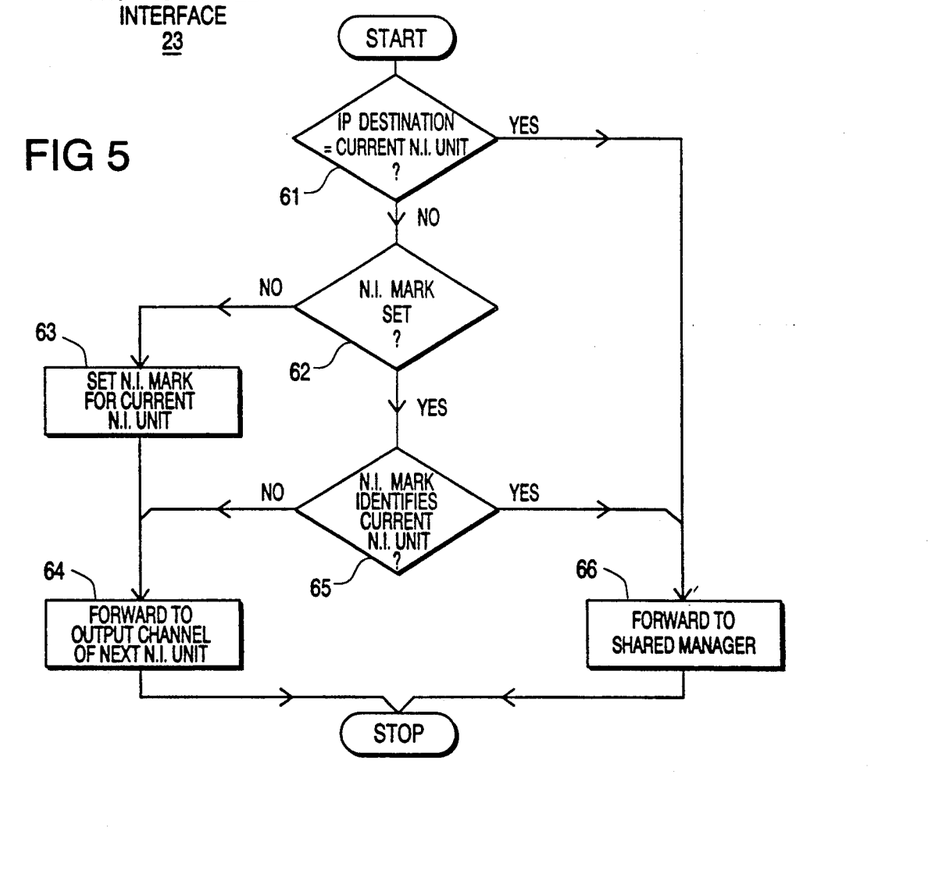
FIG. 5 is a flow chart illustrating the operation of the FIG. 4 input channel.

The controller 42, which is preferably implemented in programmable hardware, controls the switch 43 in accordance with the functionality represented by the flow chart of FIG. 5. More particularly, for each message passed from the head of the FIFO buffer 41A or 41B to the switch 43, the controller 42 first determines whether the destination IP address of the message is that of the current network interface unit 20 (step 61); if this is the case, it means that the message has been addressed to the router itself. In this case, the controller 42 controls the switch 43 to pass the message via output 30 to the shared routing manager 11 (step 66) but with its prepended network-interface mark removed.

If the message was not one intended for the router itself, then the controller 42 checks to see if the network-interface mark is set to a non-zero value which would indicate that the message has already passed through a local routing manager of another network interface unit. If the controller 42 determines (step 62) that the network-interface mark has not been set, then the controller 42 causes the switch 43 to forward the message over output 29, across the outbound link 22, to the output channel 50 of the local routing manager 21 of the next downstream network-interface unit 20 (step 64). However, in the course of the message passing through the set-mark unit 46 to the output 29, the controller 42 causes the unit 46 to set the network-interface mark to a value identifying the current network-interface unit (step 63); messages handled in this manner will be those newly received by the network-interface from its associated network.

If the controller 42 ascertains that the network-interface mark associated with the message under consideration has been set, then it examines the mark to ascertain whether the mark identifies the current network-interface unit (step 65). If this is not the case, then the controller 42 controls the switch 43 to forward the message with its mark unchanged, via output 29 and the associated link 22, to the output channel 50 of the local routing manager 21 of the next downstream network-interface unit. However, if the network-interface mark corresponds to the current network interface unit, then this indicates that the message, after having been previously tagged by the present network-interface unit, has traversed around the closed loop formed by the links 22 and local routing managers 21 without being recognized and routed by any of the local routing managers. Since the message is unroutable by all the local routing managers 21, the controller 42 proceeds to forward the message to the shared routing manager 11 via output 30 but with its prepended network-interface mark removed.

From the foregoing it can be seen that the input channel 40 serves to introduce newly received messages into the closed-loop message circulation system formed by the local routing managers 21 and links 22, except for those messages which are intended for the router itself. The input channel 40 also serves to remove from circulation around the closed loop, those messages that have completed one full circuit and must therefore be assumed unroutable by the local routing managers 21. It will be appreciated that although messages newly received over a network, are passed on from the local routing manager 21 of the receiving interface unit without any consideration being given as to whether the messages should be sent out on the network associated with the interface unit, these messages will, of course, never normally be required to be so routed since if they were intended for a destination on that network, they would have been sent there directly initially and not to the router.

Figure 6:
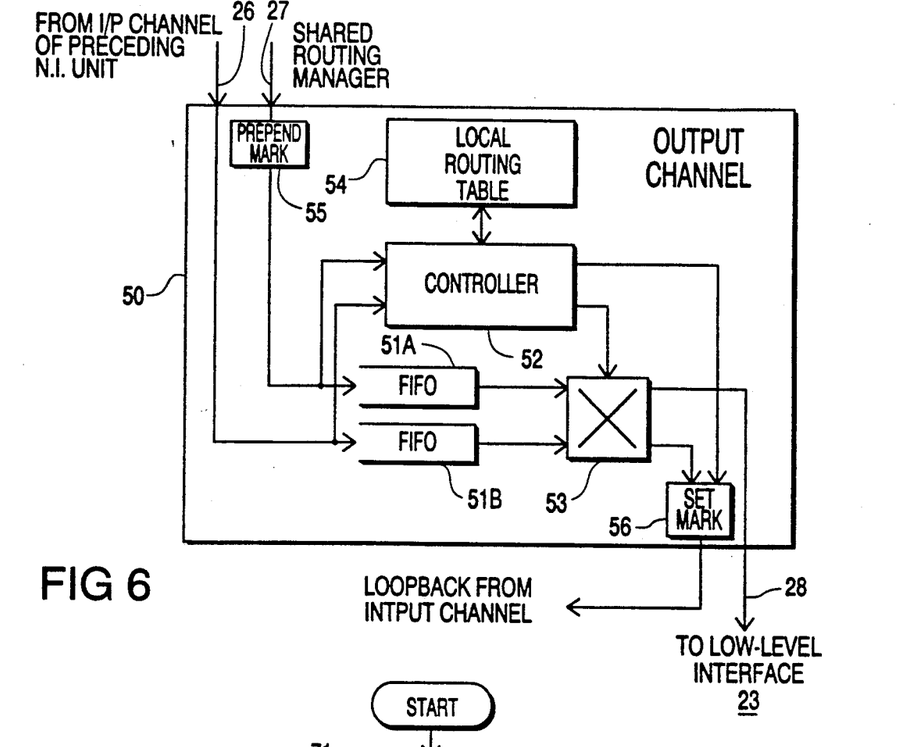
FIG. 6 is a functional block diagram of an output channel present in each local routing manager shown in FIG. 3.

The output channel 50 is shown in functional block diagram form in FIG. 6. The output channel 50 comprises two input FIFO buffers 51A, 51B. The buffer 51A queues messages received over input 27 from the shared routing manager 11, whilst the buffer 51B queues messages received over input 26 from the input channel 40 of the upstream network-interface unit 20. In addition, the output channel 50 comprises a controller 52, and a switch 53 connected on its input side to the output of the FIFO buffer 51 and on its output side both to the output 28 connecting the local routing manager to the low-level interface hardware 23 and to the input channel 40 of the same local routing manager 21. The controller 52 is operative to examine the destination IP address of each message entered into the FIFO buffers 51A and 51B and to switch that message in accordance with the examined destination address. In carrying out its controlling function, the controller 52 accesses a local routing table 54 which relates destination IP addresses to the physical addresses of entities connected to the network associated with the network-interface unit of which the output channel 50 forms a part. The controller 52 is preferably implemented as programmable hardware with the local routing table 54 being maintained in RAM memory.

As for the input channel 40, the output channel 50 also includes a prepend-mark unit 55 for prepending a network-interface mark, in the form of a null octet, to each message entering the message circulation loop, these being the messages received over input 27 from the shared routing manager. In addition, the output channel has a set mark unit 56 for setting the value of a mark prepended to messages looped back to the input channel.

Figure 7:
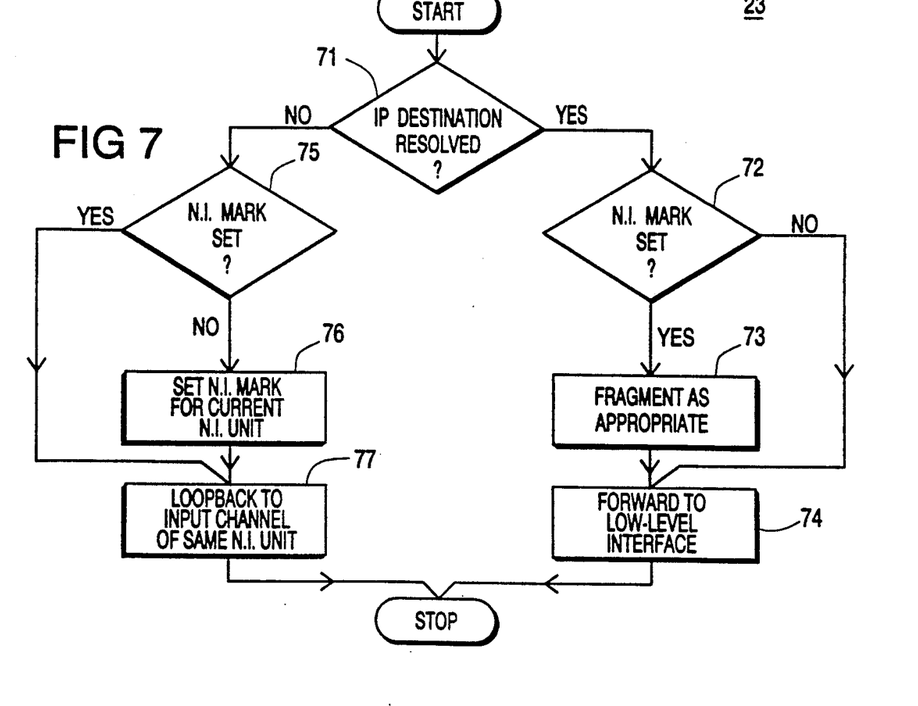
FIG. 7 is a flow chart illustrating the operation of the FIG. 6 output channel.

The controller 52 is operative to control the operation of the output channel 50 in accordance with the flow chart illustrated in FIG. 7. More particularly, for each message to be switched by the switch 53, the controller 52 first looks up the destination IP address of the message in the local routing table 54 (step 71). If no entry exists for the destination IP address, then the controller 52 assumes that the message is not one requiring to be transmitted on over the network associated with the network interface unit of which the output channel forms a part. In this case, the controller next examines the message to see if the network-interface mark prepended to the message has been set (step 75). Where a network-interface mark is set, the controller 52 controls the switch 53 to pass the message, together with its network-interface mark, to the input channel 40 of the same local routing manager (step 77). If the network-interface mark is not set, then the controller 52 assumes that the message is one that has been passed to the local routing manager from the shared routing manager—that is, it is a message that the shared routing manager believes should be routed out over the network associated with the current network-interface unit.

At this point, the controller 52 recognizes that its knowledge as represented by the contents of the local routing table 54 is probably deficient in as much as there should have been an entry in the local routing table 54 enabling it to have recognized the destination IP address of the message and have passed the message to the associated low-level interface hardware for onward transmission. Clearly, there is little point in the message being entered into the closed-loop message-circulation system to traverse all the other local routing managers; accordingly, the controller 52 causes the unit 56 to set a network-interface mark to a value identifying the current network interface unit (step 76). Thereafter, the message is passed to the input channel 40 of the same local routing manager 21 where the network-interface mark is recognized as identifying the current unit; this results in the message being passed back to the shared routing manager 11. At the same time, the controller 42 of the input channel 40 flags the shared routing manager 11 that the message is one that the shared routing manager 11 has previously routed but that the local routing table 54 does not contain the relevant information. In these circumstances the shared routing manager is arranged to effect an update of the local routing table 54 via the backplane bus 12 before passing the message back to the interface unit concerned.

Returning now to consideration of the FIG. 7 flow chart, if the destination IP address of a message is found in the local routing table 54 by the controller 52, then the controller 52 will check to see if the network-interface mark prepended to the message has been set (step 72). If this is not the case, then it indicates that the message has been received from the shared routing manager 11 and the controller 52 assumes that any fragmentation of the message required to transmit it over the associated network has already been carried out by the shared routing manager 11.

On the other hand, if the network-interface mark is set, then the controller 52 effects any appropriate fragmentation of the message (step 73). Thereafter the message (or messages where the original message has been fragmented) is forwarded, together with the next-hop address but minus its network-interface mark, to the corresponding low-level interface 23 (step 74) for onward transmission over the associated network.

From the foregoing it can be seen that a newly received message is first entered into the closed-loop message-circulation system formed by the local routing managers 21 and links 22 (unless the message is intended for the router itself in which case it is passed to the shared routing manager 11 for action); these functions are carried out by the input channel 40 of the local routing manager 21 of the network interface receiving the message. In addition, the input channel 40 will also prepend a mark onto a newly received message before putting it into circulation. Each marked message will then pass between the local routing managers 21 traversing first the output channel 50 of a local routing manager and, if unrouted by the output channel, being looped back to the corresponding input channel 40 and passed on. If the destination IP address of the message is recognized by one of the output channels 50, then the message is removed from the circulation system and passed to the corresponding low-level interface hardware 23 for onward transmission over the associated network. However, if a marked message returns to the local routing manager 21 which originally set its mark, then after passing through the output channel 50 of that local routing manager, the corresponding input channel 40 will recognize the message as having completed a full circuit and pass the message to the shared routing manager 11 for routing. In due course, the shared routing manager 11 will forward the message to the appropriate network interface unit where the output channel 50 of the local routing manager 21 checks for an appropriate entry in its local routing table 54. Where no such entry exists, which will be the case if previously unrouted, the message is returned to the shared routing manager 11 via the corresponding input channel 40 and the shared routing manager 11 initiates an update of the local routing table 54 concerned before returning the message for onward transmission.

It will be appreciated that the ability of the shared routing manager to add entries to the local routing table of each local routing manager enables the router to be self-starting in the sense that the local routing tables can be initially empty and will be rapidly populated by the shared routing manager.

Second Router

Figure 8:
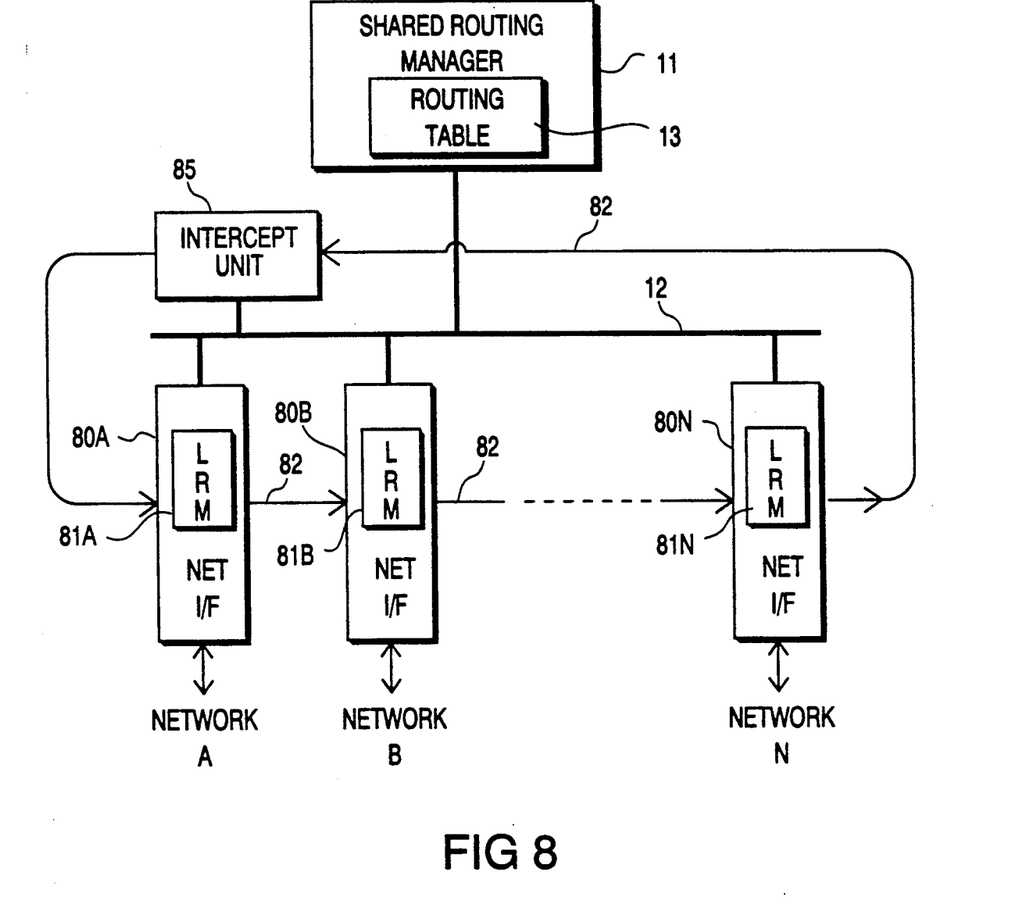
FIG. 8 is a diagram of a second router embodying the present invention.

A second embodiment of the router embodying invention is shown in FIG. 8 and comprises a plurality of network-interface units 80A to 80N operative to receive and/or transmit messages over respective associated networks A to N. The network interface units communicate with a processor-based shared routing manager 11 via a backplane bus 12. The shared routing manager 11 maintains a main routing table 13. As with the first embodiment, each network interface unit 80A to 80N includes a local routing manager 81A to 81N respectively, the local routing managers of all units being interconnected into a closed loop by corresponding unidirectional point-to-point links 82. The local routing managers 81A to 81N are similar to the local routing managers 21A to 21N of the first router embodiment with the exception that the input channels of the local routing managers 81A to 81N do not mark the messages that they place into circulation, nor do they extract the messages once a full circuit has been completed. This function, is, instead left to a specialized intercept unit 85 interposed in one of the links 82. The intercept unit 85 marks any message it receives that has not been previously marked, and in addition, serves to forward to the shared routing manager 11 any messages it receives that have been previously marked. The intercept unit 85 forwards messages to the manager 11 over the backplane bus 12. It will be appreciated that this arrangement for marking and extracting messages is less efficient than that of the first embodiment in the sense that messages may pass through certain local routing managers more than once before being removed from circulation; however, the arrangement makes the implementation of each input channel simpler. If simplicity is of greater importance, then the second embodiment is preferred. However, the first embodiment is considered to be the preferred embodiment since it is believed that efficiency is more important than is simplicity.

It is, of course, still necessary for each output channel of the local routing managers 81A to 81N to be able to tag a message as one received from the shared routing manager but unroutable because no appropriate entry was present in the corresponding routing table, the intercept unit 85 responding to such a tag to pass the message back to the shared routing manager 11 so that the latter can initiate an update of the appropriate local routing table.

From the perspective of providing a specialized interception unit as is done in the second embodiment described above, the first embodiment can now be seen to provide a distributed form of interception unit. More particularly, this distribution can be thought of as providing diverting means in each local routing manager, these diverting means identifying messages that have circulated through all the local routing managers and need to be passed to the shared routing manager. In practice, the functionality of such diverting means is to be found in the input channel of the local routing manager of the first embodiment.

Variants

It will be appreciated that many variations of the above-described routers are possible. Thus, for example, instead of the messages being marked in the first router with network-interface marks that uniquely identify the interface unit carrying out the marking, where the number of network interface units is known, the marking could be in the form of a count that is incremented / decremented by each local routing manager traversed by the message, the count reaching a predetermined value by the time it returns to the original local routing manager.

Furthermore, the means provided to communicate each network interface unit with the shared routing manager need not necessarily take the form of a backplane bus; for example, each unit could communicate with the shared routing manager over a respective bi-directional point-to-point link (separate from the links 22,82).

It will be understood that although the first and second routers have been described in relation to the routing of IP datagrams, other types of messages could equally well be routed. It is also worth noting that even where one type of message is of primary importance so that the router has its local routing managers dedicated to the routing of this message type, other types of messages can still be catered for by the more versatile shared routing manager. In this case, the input channel of each local routing manager simply needs to recognise messages of a type that it is not designed to route, and then forward these messages direct to the shared routing manager for routing. After routing by the shared routing manager, these messages are passed direct to the low-level hardware of the relevant interface unit together with the next-hop physical address.

Although in the foregoing description of the first and second embodiments of the routers, reference is generally made to the passing of messages between the interface units themselves and between the units and the shared routing manager, it is to be understood that this message passing may only involve passing the relevant message header information rather than the whole message until it becomes necessary to transmit the message from the router (the full message being temporarily stored until required).

Furthermore, although the present invention has been described above in relation to a class of apparatus known as routers, the invention has application to message-routing apparatus that lies outside what is conventionally understood by the term "routers". For example, the invention can be applied to bridges that interconnect segments (or sub-networks) of the same basic network. Additionally, the message-routing apparatus could have one (or more) of its interface units connected to serve a respective single entity via a corresponding communications arrangement and in such cases, the messages passed on to the single entity need not at that stage include a destination address. It is also possible to have more than one interface unit of the apparatus connected to the same communications arrangement. Thus, this invention is not to be limited to the disclosed embodiment, except as required by the appended claims.

We claim:

1. A message-routing apparatus for routing messages between a plurality of communications arrangements, each said message including a destination address at least when received at said message-routing apparatus, said apparatus comprising a plurality of interface units each operative to receive and/or transmit messages over an associated one of said communications arrangements, a shared routing manager, and internal communication means inter-communicating the shared routing manager with the interface units, said shared routing manager providing a shared facility to said interface units for routing messages received by said units, on the basis of their respective destination addresses, to appropriate ones of said units for onward transmission over the associated communications arrangement, each said unit including a local routing manager with input means for receiving messages to be routed including messages newly received by the unit from its associated communications arrangement, first output means for messages that are to be transmitted on over the associated communications arrangement, and second output means for other of said messages, said local routing manager being operative to provide a limited routing function involving identifying messages received by said input means which from their destination addresses are to be transmitted on by the same interface unit over its associated communications arrangement, and passing the identified messages, as routed messages, to said first output means and other of said messages, as unrouted messages, to said second output means; and said apparatus including a plurality of point-to-point links that serve to interconnect the local routing managers into a closed loop by connecting said second output means to each local routing manager to the said input means of a next said local routing manager whereby to permit unrouted messages to be passed along between said units for routing; said apparatus further including forwarding means for passing messages unrouted by said local routing managers to said shared routing manager for routing thereby.

2. A message-routing apparatus according to claim 1, wherein forwarding means comprises a respective diverting means associated with each said interface unit, each said diverting means being operative to divert to said shared routing manager, via said internal communications means, any message which, after having previously been passed on as a said unrouted message, by the associated interface unit, is received back at the interface unit.

3. A message-routing apparatus according to claim 2, wherein each interface unit is operative to mark each message newly received over the associated communications arrangement, the diverting means associated with that unit being operative to monitor messages received by the interface unit over a said point-to-point link and to diver to said shared routing manager any messages previously marked by that interface unit.

4. A message-routing apparatus according to claim 3, wherein for at least one said interface unit, said second output means for the local routing manager comprises a first output connected to said point-to-point link, and a second output connected to said internal communications means; the said diverting means associated with the interface unit being incorporated into the local routing manager of the unit and being operative to receive said unrouted messages and to pass them to said second output means, said diverting means passing each said unrouted message to the said first output of the second output unless the diverting means determines that the message is to go to said shared routing manager in which case it passes the message to said second output means.

5. A message-routing apparatus according to claim 4, wherein the local routing manager of said at least one said interface unit comprises:
- a first routing unit to which are passed the messages newly received over the communications arrangement associated with the interface unit, the first routing unit being operative to mark at least certain of these messages and forward them to said second output of the said second output means, and
- a second routing unit arranged to receive said unrouted messages that are passed to the said input means of the local routing manager via a said link, the second routing unit being operative to route each message it receives on the basis of the destination address of the message, whereby messages which the second routing unit recognizes as intended for onward transmission over the communications arrangement associated with the interface unit, are passed to said first output means of the local routing manager and the remaining messages being passed to said first routing unit, said diverting means being incorporated into first routing unit operative to monitor each message received from the second routing unit.

6. A message-routing apparatus according to claim 5, wherein said first routing unit is operative to monitor the destination address of each message newly received over the communications arrangement associated with the interface unit, and to pass the message:
- to said shared routing manager, via said second output of the second output means, where said destination address indicates that the message is intended for the message-routing apparatus itself, and otherwise
- to said second output of the second output means, after marking the message.

7. A message-routing apparatus according to claim 5, wherein said second routing unit includes a local routing table associating particular destination addresses with the interface unit, the second routing unit being operative to look up the destination address of each said unrouted message it receives in said local routing table and to recognize the message as one intended for onward transmission over the communications arrangement associated with the interface unit if the table associates the looked-up address with the interface unit.

8. A message-routing apparatus according to claim 7, wherein the destination addresses are high-level addresses valid across all said communications arrangements but requiring resolution into low-level physical addresses when used to direct a message across at least one said communications arrangement, each entry in said local routing table of each interface unit resolving a high-level address into a physical one for the associated communications arrangement.

9. A message-routing apparatus according to claim 8, wherein the second routing unit is operative, in the absence of an association in its local routing table for a said message received from the shared routing manager, to mark the message as from the interface unit before passing it to said first routing unit whereby the message is forwarded by the first routing unit to said shared routing manager.

10. A message-routing apparatus according to claim 9, wherein the destination addresses are high-level addresses valid across all said communications arrangements but requiring resolution into low-level physical addresses when used to direct a message across at least one said communications arrangement, each entry in said local routing table of each interface unit that is associated with a said at least one communication arrangement resolving a high-level address into a physical one for the associated communications arrangement.

11. A message-routing apparatus according to claim 7, wherein said second routing unit is operative to receive, via said internal communication means, messages routed by the shared routing manager to the interface unit for onward transmission thereby over the associated communications arrangement, said second routing unit being operative to look up the destination address of each such message in its local routing table and if no association exists between that address and the interface unit, to signal to said shared routing manager that no such association exists, the shared routing manager being thereupon operative to update the local routing table via said internal communication means.

12. A message-routing apparatus according to claim 11, wherein the destination addresses are high-level addresses valid across all said communications arrangements but requiring resolution into low-level physical addresses when used to direct a message across at least one said communications arrangement, each entry in said local routing table of each interface unit that is associated with a said at least one communication arrangement resolving a high-level address into a physical one for the associated communications arrangement.

13. A message-routing apparatus according to claim 1, wherein said forwarding means comprises an intercept unit operatively interposed in a said link and arranged to divert to said shared routing manager any unrouted message passing a second time along that link.

14. A message-routing apparatus according to claim 1, wherein at least two said interface units are associated with the same said communications arrangement.

* * * * *

UNITED STATES PATENT AND TRADEMARK OFFICE
CERTIFICATE OF CORRECTION

PATENT NO. : 5,293,488
DATED : March 8, 1994
INVENTOR(S) : Martyn J. Riley, et al It is certified that error appears in the above-indentified patent and that said Letters Patent is hereby corrected as shown below:

Claim 3, line 7 (column 22), "diver" should be corrected to --divert--.

Signed and Sealed this

Twenty-third Day of August, 1994

Attest:

BRUCE LEHMAN

*Attesting Officer*  *Commissioner of Patents and Trademarks*